Nov. 21, 1933.                R. A. SMITH                1,935,730
                           FLEXIBLE COUPLING
                           Filed Aug. 6, 1930
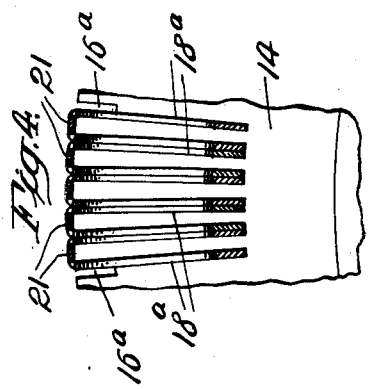
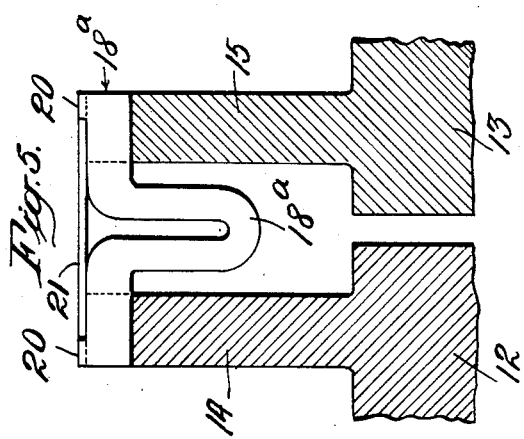
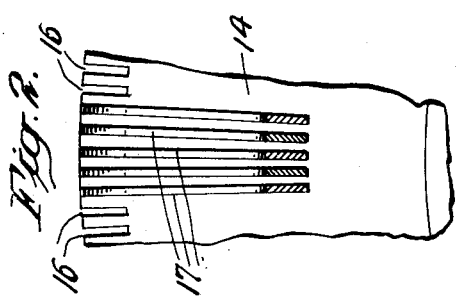
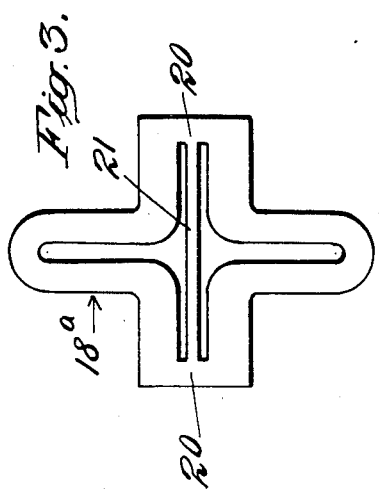
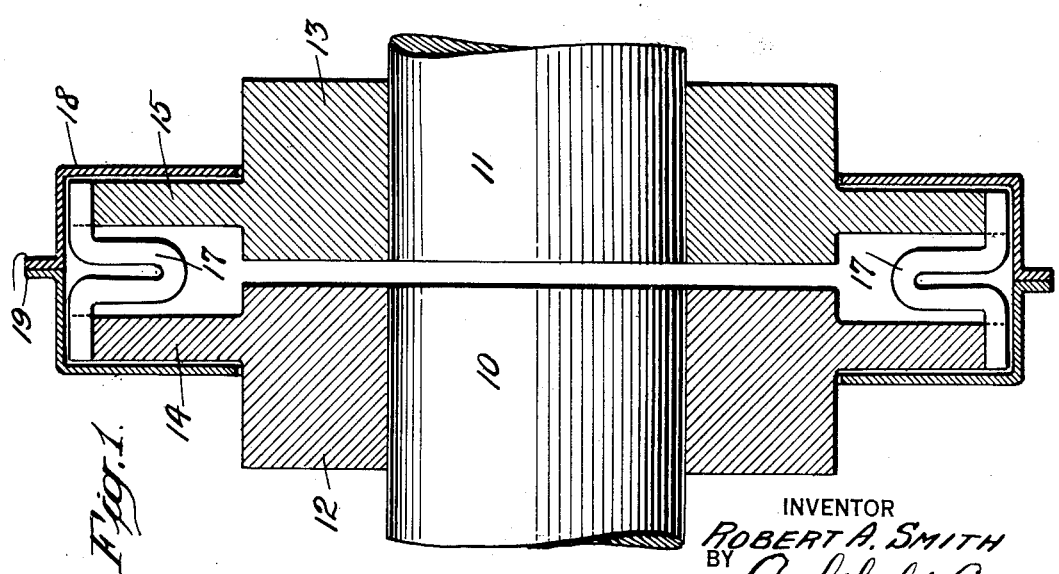
INVENTOR
*Robert A. Smith*
BY *Archibald Coy*
ATTORNEY Patented Nov. 21, 1933

1,935,730

UNITED STATES PATENT OFFICE 1,935,730

FLEXIBLE COUPLING

Robert A. Smith, Mahwah, N. J., assignor to Smith & Serrell, Elizabeth, N. J., a copartnership consisting of Robert A. Smith and John J. Serrell Application August 6, 1930. Serial No. 473,339

8 Claims. (Cl. 64—96)

This invention relates to flexible couplings adapted for use in transmitting power from one to another of two rotary members, such, for example, as two substantially coaxial shafts. In installations of machinery where rotary members, such as shafts, are positioned end to end and driving connections between the same are to be established, it is almost impossible to obtain exact alignment, for example, as a result of eccentricity of the two adjacent ends or of lack of alignment as to direction when the adjacent ends are properly positioned laterally with reference to each other. If, under such circumstances of departure from alignment, the ends of the shafts are rigidly connected, the mechanism will be subjected in operation to heavy and unnecessary stresses and to abnormal wear. Use is made of suitable flexible couplings to compensate not only for lack of concentric and angular alignment of the two members to be connected, but also to provide for resilient or cushioning action between the shafts.

The present invention relates more particularly to the type of flexible couplings in which two main coupling members fixed, respectively, on the adjoining ends of the two shafts are connected by a plurality of members or connectors extending between the main coupling members in directions generally longitudinal with respect to the axes of the shafts, the connection between the main coupling members being such as to permit parts thereof to move toward and from each other during the rotation of the shafts. To afford greater flexibility to the coupling, such coupling members or connectors may be made of suitable resilient or spring material. In flexible couplings of this sort either torsional strength or flexibility must be sacrificed for the benefit of the other. The main object of the present invention is to provide an improved flexible coupling which has not only substantial strength but sufficient flexibility. Another object of the invention is to provide simplified flexible coupling means efficient in operation and economical to manufacture.

Other objects and advantages will appear upon consideration of the following detailed description and of the drawing in which:

Fig. 1 is a longitudinal section of a coupling embodying the preferred form of the invention;

Fig. 2 is a fragmentary central section of the coupling shown in Fig. 1;

Fig. 3 is a modified form of connector illustrated as formed of flat sheet material;

Fig. 4 is a fragmentary view similar to Fig. 2 but illustrating the use of the connectors of Fig. 3; and Fig. 5 is a fragmentary view similar to the upper part of Fig. 1, but with the casing removed and showing the form of connector illustrated in Figs. 3 and 4.

Referring to the drawing, 10 and 11 indicate, respectively, two rotary members or shafts between which a driving connection is to be established by means including coupling members or flanges 12 and 13, respectively, fixedly attached thereto. As here shown the coupling members 12 and 13 are provided with outwardly extending flanges proper 14 and 15 having at their peripheries suitable openings 16 arranged at regular intervals therearound and adapted to cooperate with suitable resilient or spring connectors 17.

As illustrated in Figs. 1 and 2 these connectors are of sheet material with U-shaped central portions to extend inwardly into the space between the flanges 14 and 15 and with outwardly extending ends adapted to fit in the openings 16 which are preferably in the form of radial slots, the connectors being held in position in the openings 16 of the flanges 14 and 15 by means of a suitable grease cover 18 to confine the lubricant and which is here shown as split circumferentially to form sections provided at their adjoining edges with flanges 19 by means of which they can conveniently be secured together. It will be seen that the sheet metal connectors 17 are easy to manufacture and are effective in use.

In Figs. 3, 4 and 5 there is illustrated coupling means in which the connectors 18a are formed so as to include two oppositely arranged parts, each corresponding to one of the connectors 17 illustrated in Figs. 1 and 2. These U-shaped parts of the connectors 18a are integrally connected at the outer ends of the outwardly extending portions by narrow portions 20 of the material from which the connector is made, and these narrow portions are connected by a transverse strip 21. For use, the connectors 18a are bent along lines at opposite sides of the strip 21 to place the U-shaped portion substantially in parallelism, and are then placed in position in the slots or openings 16a in the coupling members, the portions 20 at opposite ends of the strip 21 of each connector lying on the tops of the teeth between the openings or slots 16a on the flanges 14 and 15. Preferably the slots or openings 16a are made of suitable width to receive the down turned end portions of two of such members 18a, as illustrated in Fig. 4. In this arrangement the connection between the two flanges includes not only the inwardly extending U-shaped portions of the connectors, but also the strips 21 which extend across the tops of the teeth between said openings 16a. In this arrangement the connectors are to be held in position by a grease or lubricant confining casing similar to that shown in Fig. 1.

It will be seen that in both embodiments of the invention the sheet metal connectors provide for sufficient yielding in a torsional direction between the two flanges and that movement of portions of the flanges toward and from each other are accommodated by the sliding of the opposite ends of the connectors with reference to the portions of the flanges with which they engage.

I claim:

1. In a flexible coupling, the combination of two coupling members having circumferential flanges provided with similarly arranged openings at their adjacent surfaces, and members having their ends extending longitudinally of the axis of rotation of the coupling and adapted to be held against turning by fitting in corresponding openings in said flanges and their middle portions offset with respect to their ends in planes substantially containing the axes of said coupling members.

2. In a flexible coupling, the combination of two rotatable coupling members having substantially parallel annular flanges provided with similarly placed recesses opening at the adjacent faces and shaped to prevent turning of a member fitting therein, and resilient members with their ends fitting in corresponding recesses in the flanges and thereby held against turning and with flat connecting portions between their ends offset from the lines between their ends and lying in planes substantially containing a common axis of rotation of said members.

3. In a flexible coupling, the combination of two rotatable coupling members having substantially parallel annular flanges provided with radial slots extending to the adjacent faces of the flanges and having their bottoms at substantially the same distances from the axes of the coupling members, and flat resilient connecting members having their ends positioned in said radial slots and U-shaped portions connecting the ends and projecting inwardly into the space between the flanges.

4. A sheet material blank for making a resilient connector for the flanges of coupling members in a flexible coupling, including two U-shaped parts with the sides thereof turned outwardly at the open ends, connecting strips joining the ends of the outwardly turned portions, and a strip connecting the middle points of said connecting strips.

5. In a flexible coupling, the combination of two rotatable coupling members having substantially parallel annular flanges with teeth formed between radial slots extending inwardly from their peripheries, and resilient connectors formed at opposite ends to fit over corresponding teeth of the two flanges.

6. In a flexible coupling, the combination of two rotatable coupling members having substantially parallel annular flanges with teeth formed between radial slots extending inwardly from their peripheries, and resilient connectors having ends formed to fit over corresponding teeth on the two flanges and with the material at the sides of a thickness to enable the connectors to be applied to adjacent teeth on each flange.

7. In a flexible coupling, the combination of two rotatable coupling members having substantially parallel annular flanges with teeth formed between radial slots extending inwardly from their peripheries, and resilient connectors cooperating with corresponding teeth of the two flanges, each resilient connector including at each side of the two teeth connected thereby a part having ends located in the corresponding slots and a U-shaped middle and at the top of the two teeth strips connecting the parts in the slots at opposite sides of the teeth and a strip extending from one of the two teeth to the other and connected at its ends with the strips extending across the teeth.

8. A sheet metal blank for making a resilient connector for the flanges of coupling members in a flexible coupling including a U-shaped connector flat in the plane of the U and an angularly directed extension on the free end of each leg of the U.

ROBERT A. SMITH.